(No Model.)

A. CAMPBELL.
FLEXIBLE JOINT.

No. 525,884.        Patented Sept. 11, 1894.

Witnesses,
J. H. Shumway
Lillian D. Kelsey

Albert Campbell,
Inventor
By Atty's
Earle Seymour

THE NORRIS PETERS CO., PHOTO-LITHO., WASHINGTON, D. C.

UNITED STATES PATENT OFFICE.

ALBERT CAMPBELL, OF NOROTON HEIGHTS, CONNECTICUT.

FLEXIBLE JOINT.

SPECIFICATION forming part of Letters Patent No. 525,884, dated September 11, 1894.

Application filed January 15, 1894. Serial No. 496,955. (No model.)

*To all whom it may concern:*

Be it known that I, ALBERT CAMPBELL, of Noroton Heights, in the county of Fairfield and State of Connecticut, have invented a new Improvement in Flexible Joints; and I do hereby declare the following, when taken in connection with the accompanying drawings and the letters of reference marked thereon, to be a full, clear, and exact description of the same, and which said drawings constitute part of this specification, and represent, in—

Figure 1:
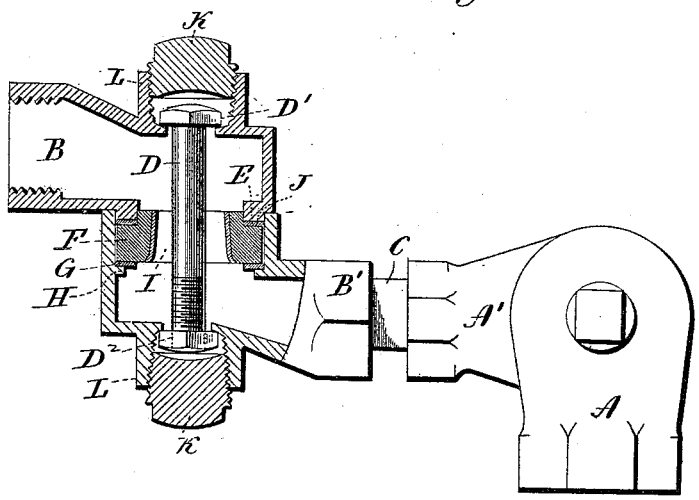
Figure 2:
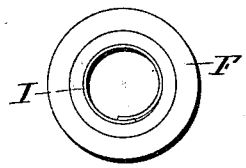

Figure 1, a view, partly in elevation and partly in central section, of a flexible joint constructed in accordance with my invention; Fig. 2, a detached plan view of the packing ring and expansible ferrule.

My invention relates to an improvement in flexible joints for steam, water, compressed air or other pipes, the object being to provide a simple, durable, convenient and effective joint.

With these ends in view, my invention consists in a flexible joint, having certain details of construction and combinations of parts, as will be hereinafter described and pointed out in the claims.

My improved joint, as herein shown, consists of four members, A and A', and B and B', arranged together in pairs, the inner member A' of one pair being connected with the corresponding inner member B' of the other pair by means of a short externally threaded sleeve C, on which either pair may be turned as desired. Inasmuch as each pair of members corresponds in construction and operation to the other, a description of one pair will suffice; and for the same reason, only one pair has been shown in section, viz.: the pair comprising the members B and B', which will be described in detail. These two members are connected together by means of a coupling-bolt D, passing centrally through them and concentric with them, and furnished at one end with a fixed head D' and at the opposite end, which is threaded, with a removable nut $D^2$. The outer member B is constructed upon its inner face with a projecting annular shoulder E, adapted in diameter to fit snugly within the circular open inner end of the member B', whereby the two members are connected together, so that the outer member may be freely rotated upon the inner member. The joint thus formed between the two members is packed by a heavy ring of flexible rubber F or equivalent material, which is supported at its inner edge upon a heavy inwardly projecting washer G, in turn supported upon a narrow annular rib H, projecting inward from the inner member B', the open inner end of which is practically occupied by the said packing ring F. If desired, some other means than the rib H might be employed to support the washer G. Within the said packing ring F I locate an expansible sheet metal ferrule I, having overlapped ends, as shown in Fig. 2, and tapering from its inner end outward the said ends sliding upon each other. This ferrule has the twofold function of preventing the flexible packing ring F from being displaced inward and closing the passage between the two members, and also of laterally expanding the said ring so as to force the outer periphery thereof into close contact with the adjacent walls of the open inner end of the inner member B'; for, the ferrule being tapering in form and larger at its inner than at its outer end, the pressure within the joint will expand it, with the effect mentioned. Furthermore, the pressure within the joint will be exerted outward against the inner edge of the packing ring F and against the overhanging inner edge of the washer G, and lift the ring and washer so as to force the outer edge of the ring against the shoulder E, aforesaid, of the outer member B, and thus assist in packing the joint in that direction. It will thus be seen that the packing is pressure-set, as the term is, inasmuch as it is constructed and arranged so that the pressure within the joint will act upon the packing to keep it tight. As herein shown, I have located an anti-friction washer J between the outer edge of the ring F and the shoulder E, the ring being recessed to receive the said washer and shoulder. This washer may be of lead or hard rubber, or brass, or any other suitable material, according to the use to which the joint is put.

If the joint is employed in a steam system, hard rubber or brass will by preference be employed. If, on the other hand, the joint is used in a water system or in a compressed air system, the anti-friction washer may be dispensed with altogether, and the rubber packing ring allowed to come into direct contact with the shoulder E of the outer member B of the joint. As herein shown, the two members of the joint are packed over the opposite ends of the bolt D by means of tapering externally threaded plugs K, inserted into internally threaded hubs L, formed integral with the outer faces of the said members; or if desired, the ends of the bolt may be extended entirely through the said members, in which case the plugs K would be dispensed with. In that case I should locate packing of some kind in the bottoms of the hubs for the head D' and the nut D² to rest upon. Then the pressure within the joint, tending to force the two members apart, would make such packing effective. It will be understood that the two pairs of members may be moved with respect to each other by turning them on the threaded sleeve C, and that the outer members A and B of the respective pairs may be freely turned in planes at a right angle to each other. By means of all these movements my improved joint is made flexible, so to speak, so as to be accommodated to any position. The outer ends of the members A and B of the two pairs of members are designed, as it will be understood, to receive pipes.

It is apparent that in the use of my invention, I may resort to some changes from the construction herein shown and described, and I would therefore have it understood that I do not limit myself to the exact form set forth, but hold myself at liberty to make such changes and alterations as fairly fall within the spirit and scope of my invention.

Having fully described my invention, what I claim as new, and desire to secure by Letters Patent, is—

1. A flexible joint, having two members joined together by a bolt passing through and located concentric with them, and the two members being constructed to have one turn upon the other, with a packing ring located within one member to pack the joint between the two members, and containing an expansible tapering metal ferrule which expands it laterally, the said ring being supported so as to be moved edgewise toward the other member, substantially as set forth.

2. In a flexible joint, the combination with an outer member, constructed upon its inner face with an annular shoulder, of an inner member having its inner end open to receive the said shoulder, whereby a joint is formed between the two members enabling the outer member to be turned upon the inner member, a bolt passing through the two members and concentric therewith, and packed at its ends, an expansible packing ring, located within the open inner end of the inner member, and resting at its inner edge upon a washer supported within the said inner member, and an expansible ferrule located within the said expansible packing ring and tapering from its inner end outward, and expansible to expand the said ring, which is also movable directly outward toward the shoulder of the outer member, substantially as set forth.

In testimony whereof I have signed this specification in the presence of two subscribing witnesses.

ALBERT CAMPBELL.

Witnesses:
FRED C. EARLE,
LELLIAN D. KELSEY.